US010805931B2

(12) United States Patent
Cho et al.

(10) Patent No.: US 10,805,931 B2
(45) Date of Patent: Oct. 13, 2020

(54) RESOURCE ALLOCATION METHOD AND APPARATUS FOR WIRELESS BACKHAUL NETWORK BASED ON REINFORCEMENT LEARNING

(71) Applicant: Korea Advanced Institute of Science and Technology, Daejeon (KR)

(72) Inventors: Dong Ho Cho, Daejeon (KR); Dong Jin Ji, Daejeon (KR); Hyuk Joon Lee, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 45 days.

(21) Appl. No.: 16/286,844

(22) Filed: Feb. 27, 2019

(65) Prior Publication Data

US 2019/0268894 A1 Aug. 29, 2019

(30) Foreign Application Priority Data

Feb. 28, 2018 (KR) ........................ 10-2018-0024400

(51) Int. Cl.
*H04W 72/04* (2009.01)
*H04W 28/16* (2009.01)
*G06N 3/02* (2006.01)

(52) U.S. Cl.
CPC ......... *H04W 72/048* (2013.01); *H04W 28/16* (2013.01); *G06N 3/02* (2013.01)

(58) Field of Classification Search
CPC ........ G06N 3/006; G06N 3/02; G06N 3/0445; G06N 3/0454; G06N 3/08; H04W 28/16; H04W 72/048; H04W 52/244; H04W 72/046; H04W 16/02; H04W 16/24; H04W 64/003
See application file for complete search history.

(56) References Cited

U.S. PATENT DOCUMENTS

| 2013/0143541 | A1 | 6/2013 | Henderson et al. | |
| 2019/0014488 | A1* | 1/2019 | Tan | G06N 3/0445 |
| 2019/0230046 | A1* | 7/2019 | Djukic | H04L 41/5009 |
| 2019/0364492 | A1* | 11/2019 | Azizi | H04W 48/10 |
| 2020/0084683 | A1* | 3/2020 | Moosavi | H04W 36/24 |

FOREIGN PATENT DOCUMENTS

| JP | 2008-042897 A | 2/2008 |
| KR | 10-2014-0059258 A | 5/2014 |
| KR | 10-1415670 B1 | 7/2014 |

OTHER PUBLICATIONS

Korean Office Action for related KR Application No. 10-2018-0024400 dated Mar. 17, 2019 from Korean Intellectual Property Office.

* cited by examiner

*Primary Examiner* — Awet Haile
(74) *Attorney, Agent, or Firm* — Paratus Law Group, PLLC

(57) ABSTRACT

Disclosed is a reinforcement learning-based resource allocation method for a wireless backhaul network, which is performed by a resource allocation apparatus. The method includes estimating locations of a plurality of base stations on the basis of channel state information (CSI) measured by the plurality of base stations; and allocating resources of the wireless backhaul network to the plurality of base stations using a reinforcement learning neural network having the locations as an input.

17 Claims, 10 Drawing Sheets

(A)

(B)

(A)

(B)

RESOURCE ALLOCATION METHOD AND APPARATUS FOR WIRELESS BACKHAUL NETWORK BASED ON REINFORCEMENT LEARNING

CROSS-REFERENCE TO RELATED APPLICATIONS

This application claims priority to and the benefit under 35 U.S.C. § 119(a) of Korean Patent Application No. 10-2018-0024400, filed on Feb. 28, 2018, in the Korean Intellectual Property Office, the entire disclosure of which is incorporated herein by reference for all purposes.

BACKGROUND

The following description relates to a resource allocation technique for a wireless backhaul network.

The number of and a required bandwidth for apparatuses connected to the Internet, such as a smart phone and an Internet of things (IoT) device, are exploding. Thus, a dense network has been proposed in which a plurality of small base stations service respective small ranges to dramatically increase total capacity.

A backhaul for the plurality of small base stations being installed in a wired manner makes problems in complexity and economic efficiency. Accordingly, a technology for supporting a plurality of small base stations with a single powerful ultra-wide-area wireless backhaul network has been proposed. The ultra-wide-area wireless backhaul network is a technology for supporting group beams, narrow beams, and multi-stream wireless communication based thereon through three-step beamforming. The technology includes forming a large group beam using analog beamforming, forming narrow beams in the group beam using digital beamforming, and supporting multi-stream wireless communication with a corresponding base station using each of the narrow beams. However, there is no method for determining how to position the narrow beams and distribute resources when the narrow beams are formed in the group beam through digital beamforming.

SUMMARY

Beamforming may be performed considering channel situations of all small base stations (full digital beamforming). However, the scheme causes a problem if the small base stations include a mobile base station so that a channel situation changes even slightly or if the number of small base stations is large.

The following description provides a technique for allocating resources to a plurality of small base stations including a mobile station in an ultra-wide-area wireless backhaul network.

In one general aspect, there is a reinforcement learning-based resource allocation method for a wireless backhaul network, which is performed by a resource allocation apparatus, the method including estimating locations of a plurality of small base stations on the basis of channel state information (CSI) measured by the plurality of small base stations, and allocating resources of the wireless backhaul network to the plurality of small base stations using a reinforcement learning neural network having the locations as an input.

In another general aspect, there is provided a reinforcement learning-based resource allocation apparatus for a wireless backhaul network, the apparatus including a communication apparatus configured to receive CSI measured by a plurality of small base stations, a storage apparatus configured to store a first neural network for estimating locations of the plurality of small base stations using a plurality of pieces of CSI and a second neural network for determining allocation of resources to the plurality of small base stations using reinforcement learning on the basis of the estimated locations, and a computational apparatus configured to estimate the locations of the plurality of small base stations by inputting the CSI to the first neural network and determine allocation of resources of the wireless backhaul network to the plurality of small base stations on the basis of a reward for a current state determined by inputting the estimated locations to the second neural network.

Figure 1:
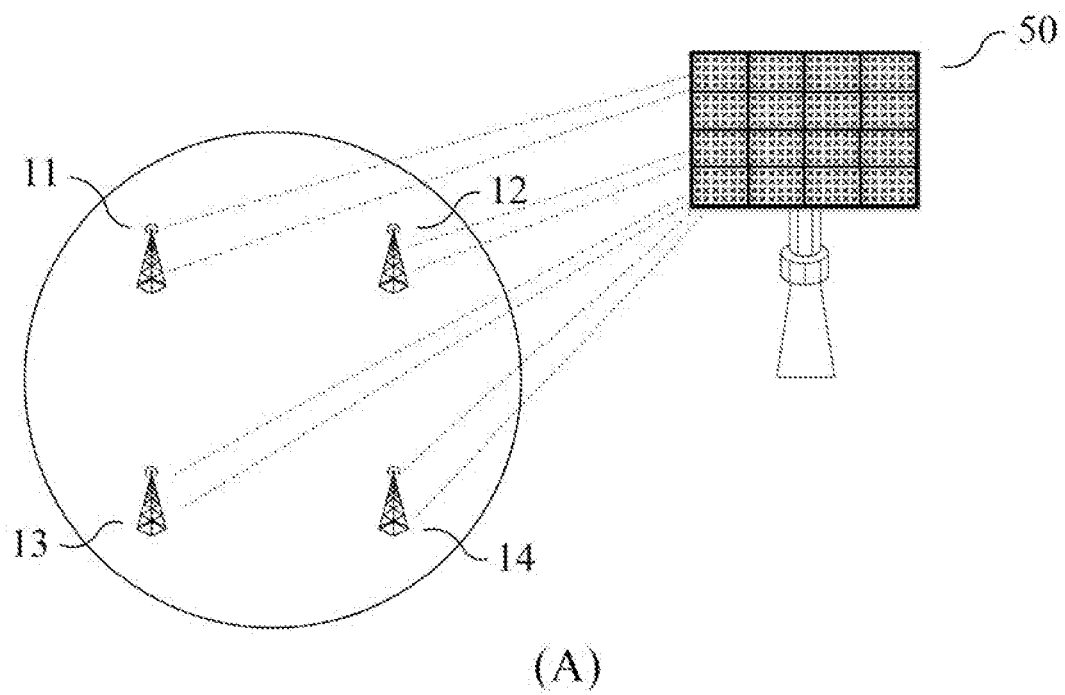
FIG. 1 illustrates an example of a plurality of small base stations using a wireless backhaul network.
Figure 1:
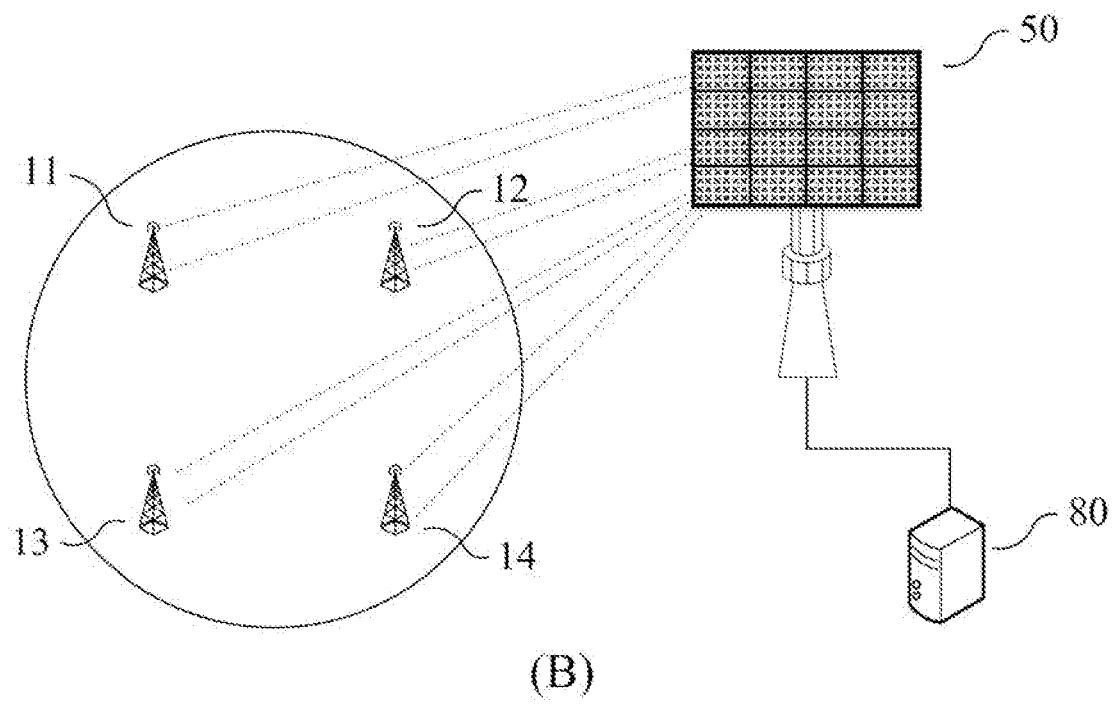

Throughout the drawings and the detailed description, unless otherwise described, the same drawing reference numerals will be understood to refer to the same elements, features, and structures. The relative size and depiction of these elements may be exaggerated for clarity, illustration, and convenience

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

The presently described examples will be understood by reference to the drawings, wherein like parts are designated by like numerals throughout. The drawings are not necessarily drawn to scale, and the size and relative sizes of the layers and regions may have been exaggerated for clarity.

It will be understood that, although the terms first, second, A, B, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Before starting detailed explanations of figures, components that will be described in the specification are discriminated merely according to functions mainly performed by the components or conventionally carried out according to common knowledge of related technical fields. That is, two or more components which will be described later can be integrated into a single component. Furthermore, a single component which will be explained later can be separated into two or more components. Moreover, each component which will be described can additionally perform some or all of a function executed by another component in addition to the main function thereof. Some or all of the main function of each component which will be explained can be carried out by another component. Accordingly, presence/absence of each component which will be described throughout the specification should be functionally interpreted.

FIG. 1 illustrates an example of a plurality of small base stations using a wireless backhaul network. In FIG. 1, a wireless backhaul apparatus 50 provides a wireless backhaul network to a plurality of small base stations 11, 12, 13, and 14. For convenience of description, FIG. 1 shows four small base stations.

Each of the small base stations receives allocated resources from the wireless backhaul network and provides a network service to a user (terminal) located in a coverage area thereof. Each of the small base stations provides a coverage area to a small cell. Each of the small base stations may be called by various names, such as a femtocell and a picocell, depending on an available coverage size. Each of the small base stations may be a stationary base station or a mobile base station.

The wireless backhaul apparatus 50 provide radio resources to the small base stations 11, 12, 13, and 14 according to a specific communication scheme. There may be various communication schemes such as 3G, Long-Term Evolution (LTE, 4G) and 5G The wireless backhaul apparatus 50 may provide a large group beam using analog beamforming and form narrow beams in the group beam using digital beamforming. However, the following description is not limited to the size, type, etc. of the beams provided by the wireless backhaul apparatus 50. For convenience of description, however, it is assumed that the small base stations 11, 12, 13, and 14 shown in FIG. 1 belong to one group beam. Therefore, it is assumed that the following description provides resources to the small base stations shown in FIG. 1 using narrow beams formed using digital beamforming.

In the section (A) of FIG. 1, only the wireless backhaul apparatus 50 and the small base stations 11, 12, 13, and 14 are shown. In the section (A) of FIG. 1, the wireless backhaul apparatus 50 may manage the allocation of resources to the small base stations 11, 12, 13, and 14. In the section (B) of FIG. 1, a wireless backhaul apparatus, small base stations 11, 12, 13, and 14, and a control apparatus 80 are shown. In the section (B) of FIG. 1, the control apparatus 80 may allocate radio resources to the small base stations 11, 12, 13, and 14 on the basis of given information. The control apparatus 80 may be an apparatus belonging to a core network. Alternatively, the control apparatus 80 may be an individual apparatus added to the wireless backhaul apparatus 50. For convenience of description, a resource allocation apparatus is described as determining to allocate resources to the small base stations. The resource allocation apparatus described herein may be the above-described wireless backhaul apparatus 50 or control apparatus 80. The resource allocation apparatus uses a machine learning model to determine values for location estimation and resource allocation for the small base stations. There may be various machine learning models that may be utilized by the resource allocation apparatus. For example, the resource allocation apparatus may use a learning model such as a neural network.

In FIG. 1 and the following description, a small base station is to be provided with a wireless backhaul network. However, a target to which resources are to be allocated by a wireless backhaul network is not limited to a small cell. Accordingly, the following description may be applied to cells of various shapes and sizes such as a macrocell, a femtocell, a microcell, and the like.

Figure 2:
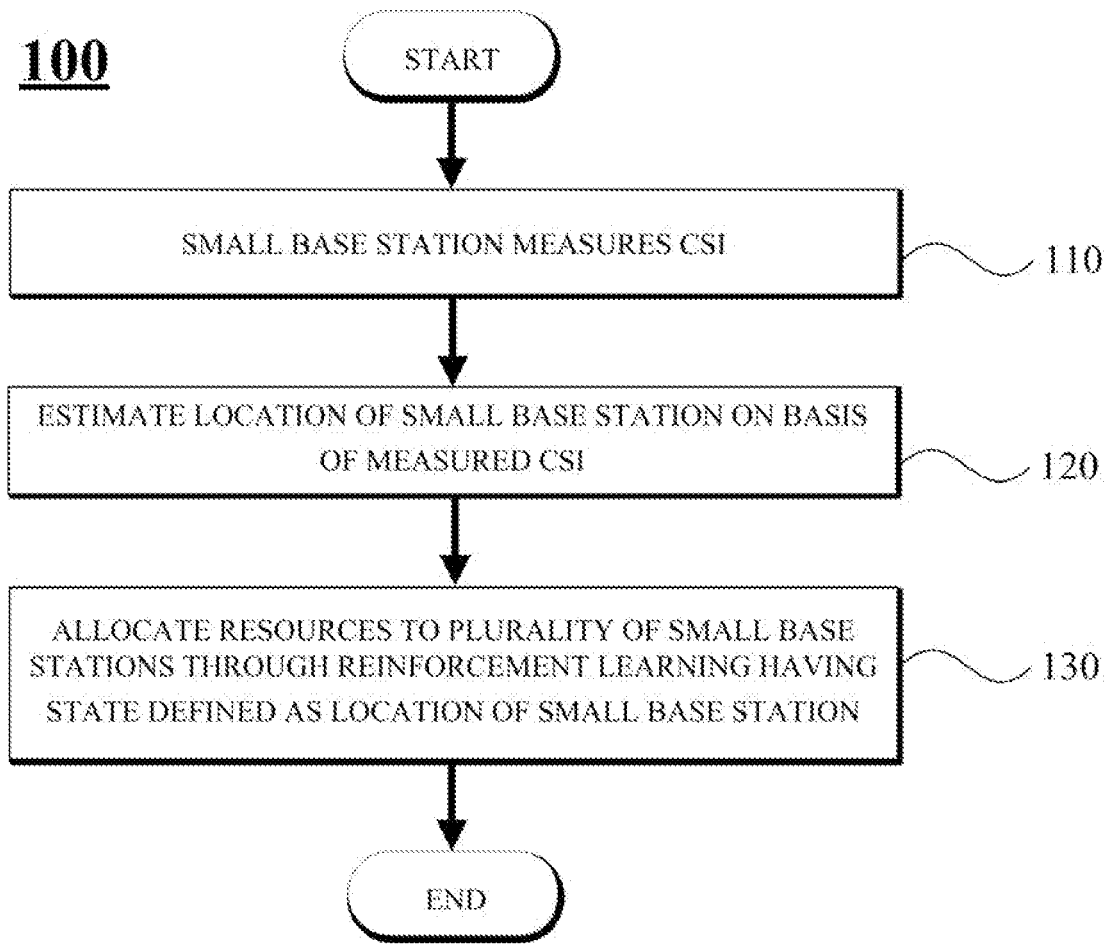
FIG. 2 illustrates an example flowchart of a resource allocation method using a wireless backhaul network.

FIG. 2 illustrates an example flowchart of a resource allocation method 100 using a wireless backhaul network. First, a small base station measures channel state information (CSI) (110). A plurality of small base stations measure CSI respectively. The CSI measured by the small base station has two types. A small base station measures CSI with respect to its own wireless backhaul network (hereinafter referred to as first CSI) and CSI with respect to its neighboring small base station (hereinafter referred to as second CSI).

The resource allocation apparatus estimates a location of the small base station on the basis of the CSI measured by the small base station (120). As described above, the small base station may be a mobile base station. In order to consider such a case, first, the resource allocation apparatus estimates the current location of the small base station. As will be described later, the resource allocation apparatus may estimate the location of the small base station using a pre-learned neural network. The resource allocation apparatus may estimate locations of the plurality of small base stations.

The resource allocation apparatus determines narrow beams and resources for the plurality of small base stations on the basis of the estimated locations of the small base stations (130). As will be described later, the resource allocation apparatus may allocate resources to the plurality of small base stations using a reinforcement learning-based neural network. Elements used for reinforcement learning are a state, an action, and a reward. The resource allocation apparatus defines a state on the basis of the location of the small base station and determines a corresponding action and a reward for the action.

Figure 3:
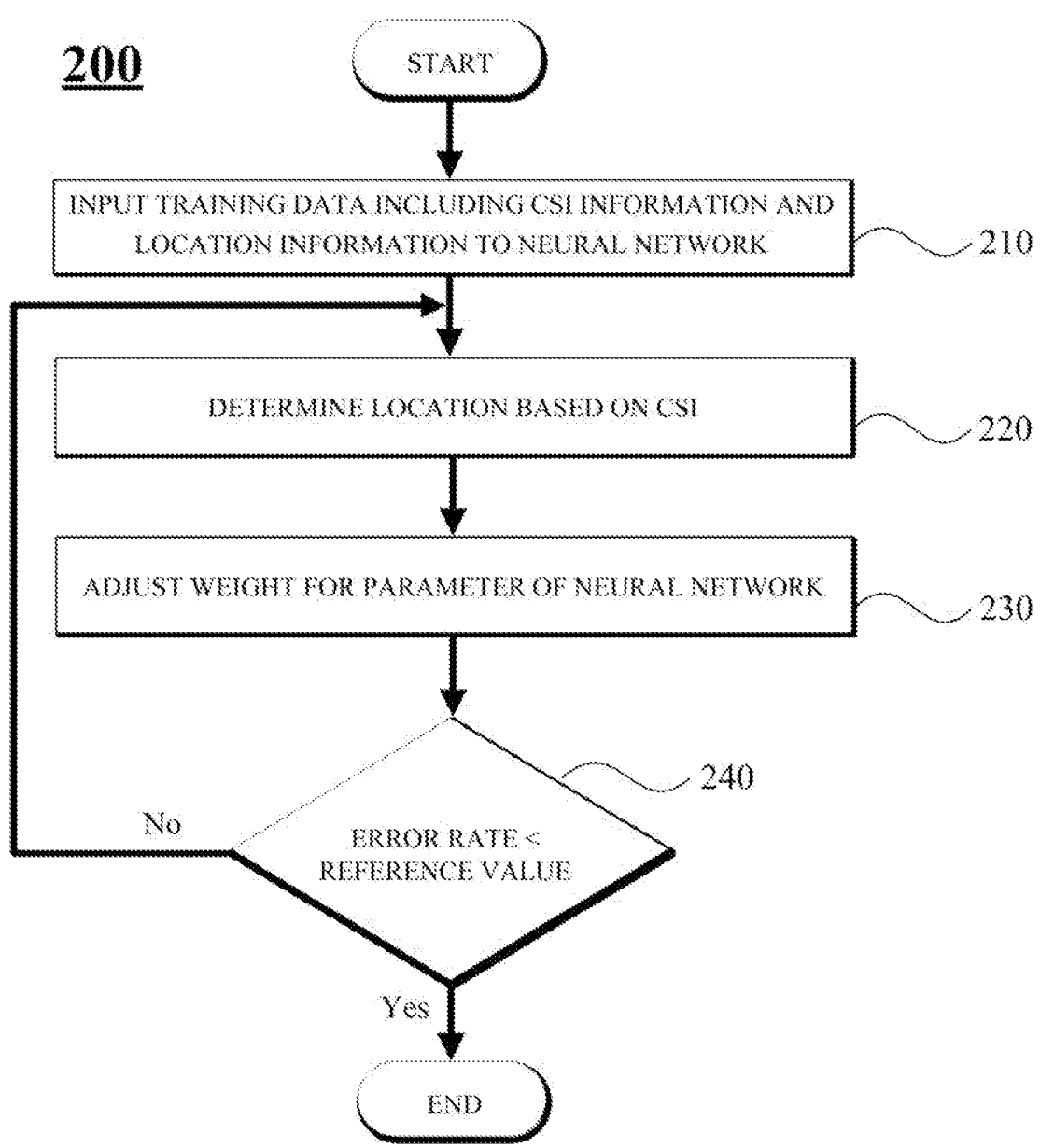
FIG. 3 illustrates an example of a neural network configuration process for estimating locations of small base stations.

First, a process of estimating the location of the small base station will be described. As described above, the resource allocation apparatus may estimate the location of the small base station using a pre-learned neural network. An apparatus for providing the neural network may be the resource allocation apparatus or a separate apparatus. For convenience of description, however, the following description assumes that the resource allocation apparatus provides the neural network. FIG. 3 illustrates an example of a neural network configuration process 200 for estimating locations of small base stations.

The resource allocation apparatus inputs training data including CSI information and location information to a neural network (210). The CSI information is information input to the neural network, and the location information is information output from the neural network. The resource allocation apparatus inputs the CSI information to the neural network and determines the location of a small base station (220). The resource allocation apparatus adjusts a weight for a parameter of the neural network while comparing a location output from the neural network to an actual location included in the training data (230). Various methods may be utilized for the adjustment of the weight of the neural network. For example, the resource allocation apparatus may adjust the weight by using a method such as stochastic gradient descent. The stochastic gradient descent is a method of updating a gradient using some input data as a sample.

When an error rate of a value output from the neural network is less than a reference value (e.g., the error rate is less than 1%), the resource allocation apparatus completes establishment of the neural network. When an error rate for the location output from the neural network is greater than or equal to the reference value, the resource allocation apparatus repeats a process of learning the neural network (240). The reference value corresponds to a value capable of securing location accuracy required for the resource allocation.

Generally, conventional location measurement systems for radio signals generally measured a position of a receiving end by using a triangulation method based on received signal strength indicators (RSSIs) or using an angle of arrival (AOA) of a radio signal in the case of a multiple-input, multiple-output (MIMO) system. However, the conventionally used systems use only a signal strength without using a signal phase and thus do not reflect all characteristics of multiple paths, resulting in a decrease in location accuracy.

Figure 4:
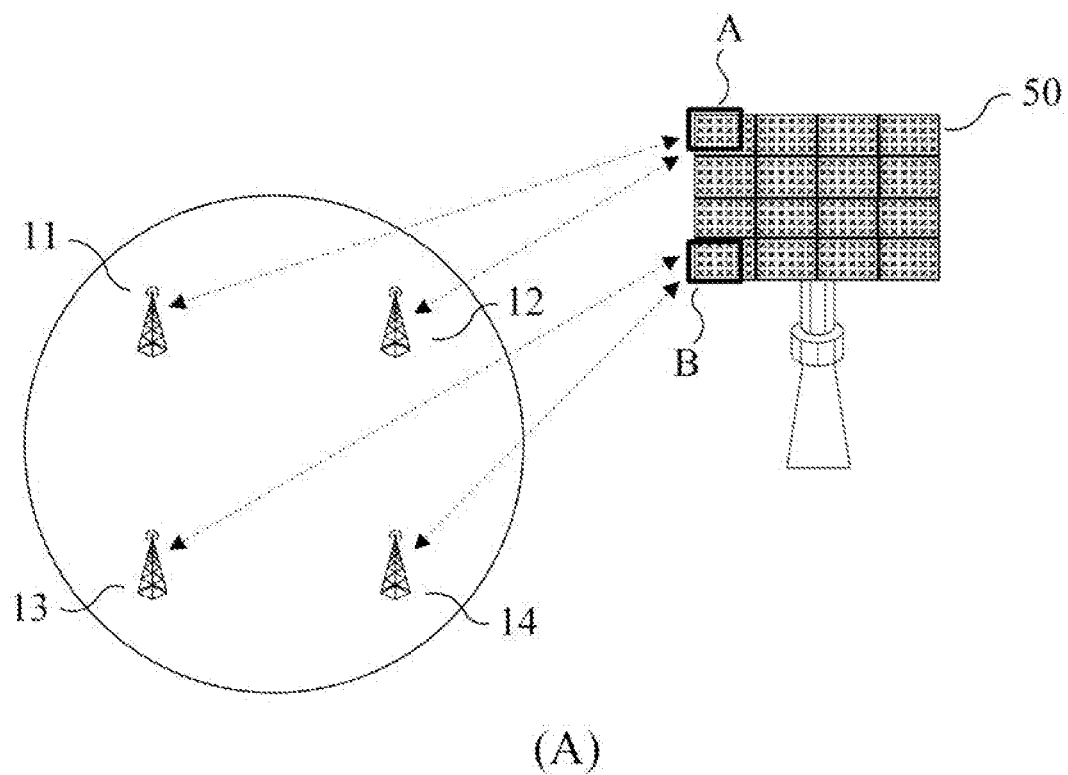
FIG. 4 illustrates an example of channel state information (CSI) measured by a small base station.
Figure 4:
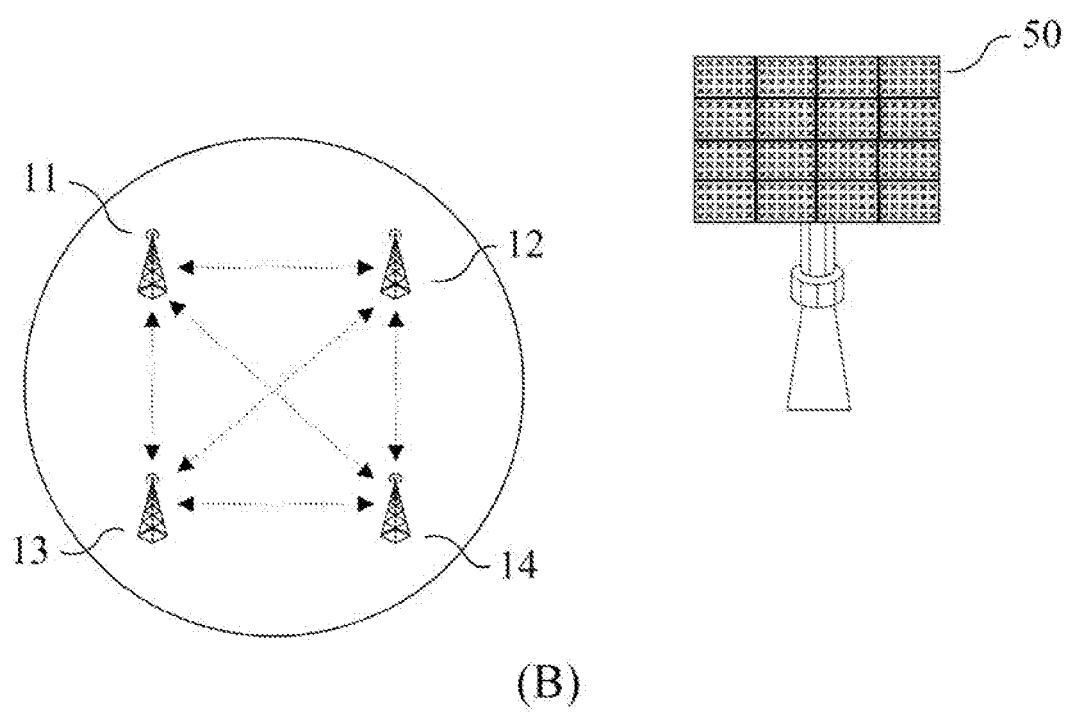

The resource allocation apparatus, which will be described below, estimates a location of a small base station using two types of CSI information. In other words, the neural network estimates the location of the small base station by using the two types of CSI information as input values. The two types of CSI information include CSI with respect to a wireless backhaul network (first CSI) and CSI with respect to a neighboring small base station (second CSI). FIG. 4 illustrates an example of CSI measured by a small base station. The section (A) of FIG. 4 shows an example in which small base stations 11, 12, 13, and 14 measure their own first CSI with respect to a wireless backhaul network. The small base stations 11, 12, 13, and 14 each calculate their own first CSI with respect to the backhaul network on the basis of a reference signal transmitted from the backhaul network. However, when all antennas of the backhaul network transmit reference signals, complexity may be too high in CSI measurement. Accordingly, a wireless backhaul apparatus may transmit reference signals through only an appropriate number (e.g., five) of antennas so that the complexity is not high enough. The number of antennas that transmit the reference signals may vary dynamically depending on system performance or communication conditions. The section (A) of the FIG. 4 shows an example in which the small base stations 11 and 12 receive a reference signal from only an antenna located in region A of a wireless backhaul apparatus 50. Also, the section (A) of the FIG. 4 shows an example in which the small base stations 13 and 14 receive a reference signal from only an antenna located in region B of the wireless backhaul apparatus 50. The antenna that transmits the reference signal may be an antenna located in a specific region or a specific random number of antennas. Consequently, it can be said that the small base stations 11, 12, 13, and 14 measure partial CSI with respect to the wireless backhaul network.

Also, the small base stations 11, 12, 13, and 14 measure second CSI with respect to their adjacent neighboring small base stations. The section (B) of FIG. 4 shows an example in which the small base stations 11, 12, 13, and 14 measure CSI with respect to their adjacent neighboring base stations (second CSI). The range of, or the distance from, the neighboring small base station may vary depending on settings. The range may be a range capable of ensuring sufficient accuracy for second CSI and measuring CSI within a predetermined time.

Figure 5:
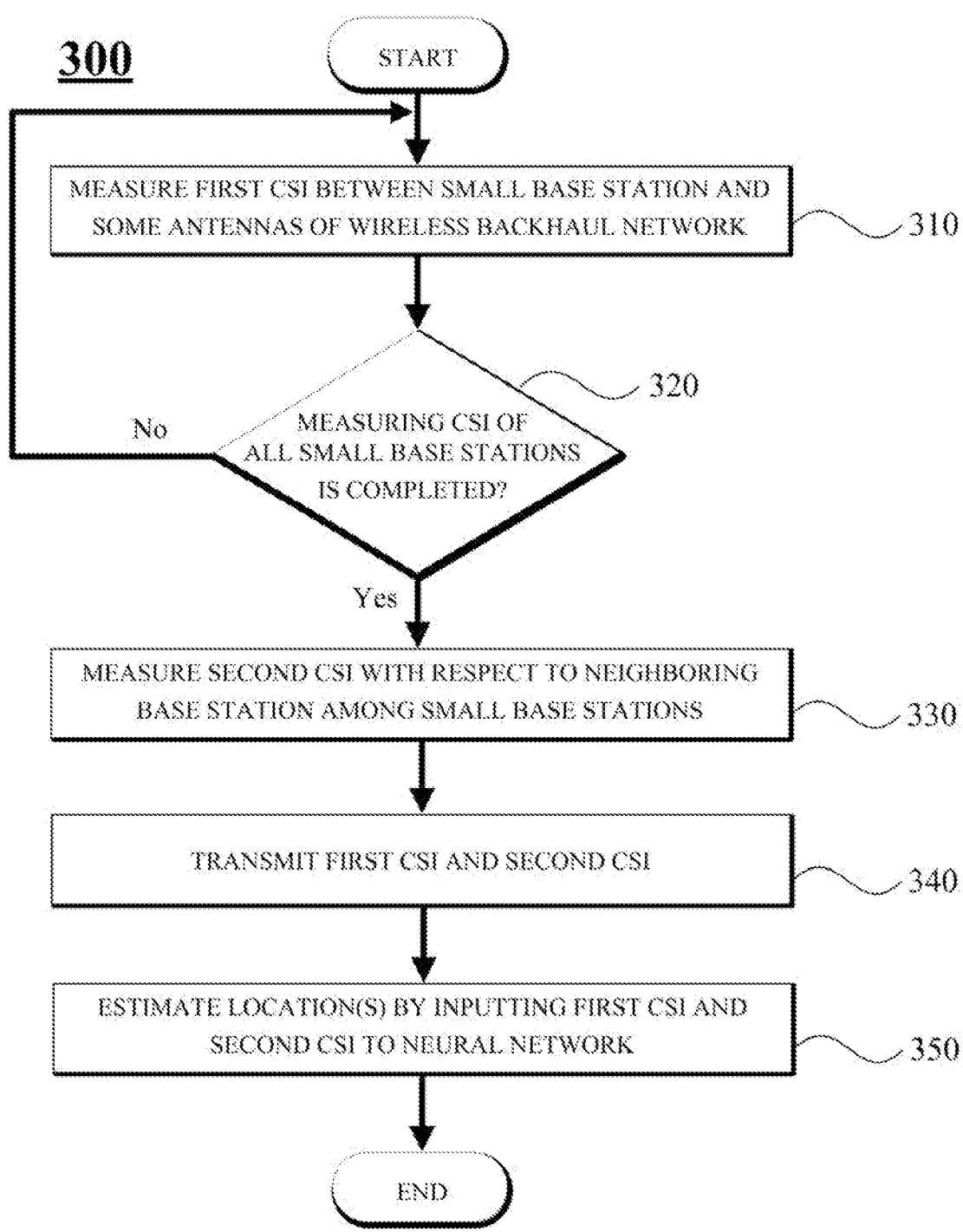
FIG. 5 illustrates an example flowchart showing a process of estimating a location of a small base station using a neural network.

FIG. 5 illustrates an example flowchart showing a process 300 of estimating a location of a small base station using a neural network. Each small base station measures first CSI with respect to a wireless backhaul network using reference signals transmitted by some antennas of the wireless backhaul network (310). Whether all small base stations to which resources are to be allocated have measured the first CSI is checked (320). In this case, the small base stations that have to measure the first CSI may be base stations belonging to one group beam. The small base stations measures second CSI with respect to their neighboring small base stations (330). FIG. 5 shows an example in which the first CSI and then the second CSI are measured, but the first CSI and the second CSI need not be measured in the order. Accordingly, the second CSI and then the first CSI may be measured. The small base stations transmit the measured first CSI and second CSI to the wireless backhaul apparatus (340). The resource allocation apparatus estimates location(s) of the small base station(s) by inputting the first CSI and the second CSI to a pre-learned neural network (350).

Figure 6:
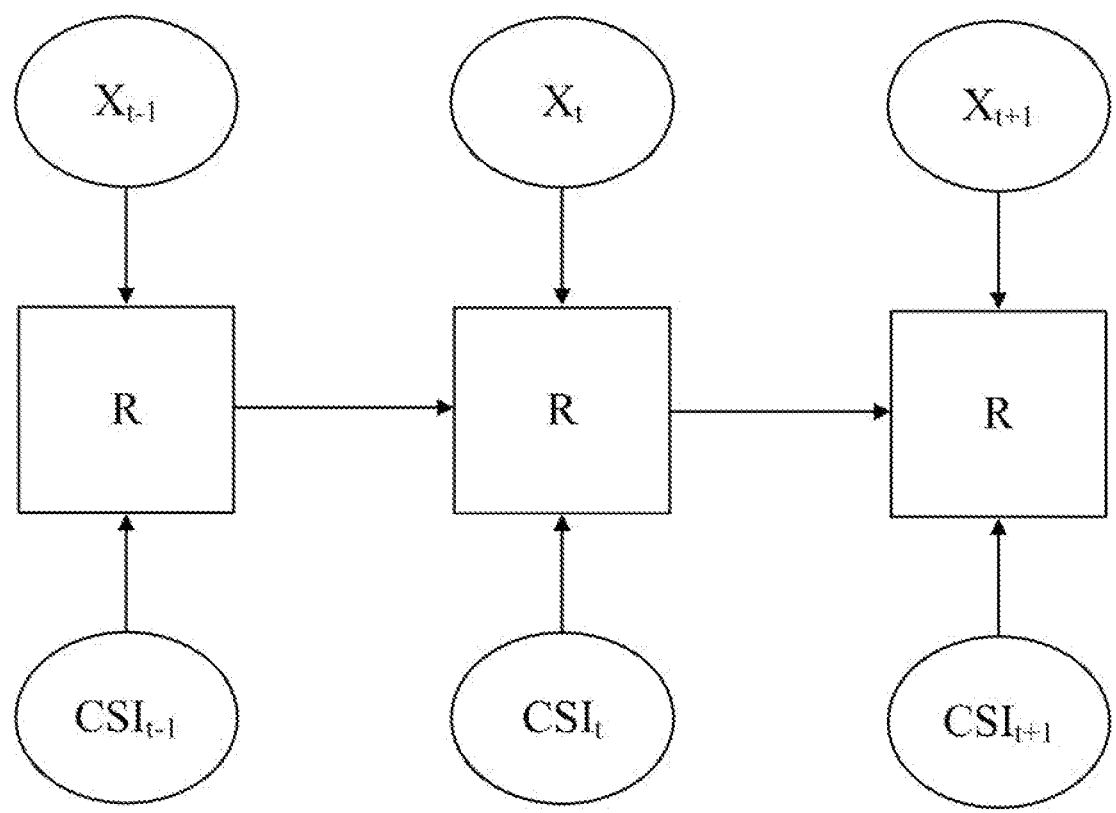
FIG. 6 illustrates an example of a neural network used to estimate a location of a small base station.

FIG. 6 illustrates an example showing a neural network used to estimate a location of a small base station. FIG. 6 shows a recurrent neural network (RNN) as an example. The neural network may use various topologies. In particular, an RNN is suitable for reflecting CSI information characteristics. The RNN receives CSI information of a target base station at any time point. The received CSI information includes the above-described first CSI and second CSI. One characteristic of the RNN is that there is remembrance (data) of a previous state, unlike other artificial intelligent neural networks. This may be represented by arrows between modules R of FIG. 6. For example, when a base station in FIG. 6 is located at a specific point at a specific time, the RNN utilizes information about a previous location of the base station when estimating a next location of the base station. Such an RNN characteristic is well suited for the current situation in which locating is performed in real time. For example, when the small base station is present at a specific time, the small base station is likely to be present near a previously located point at an adjacent time. Accordingly, the RNN, which reflects such a characteristic, may have high accuracy in estimating a location of a small base station.

Meanwhile, the network used for the location estimation is hereinafter referred to as a first neural network. A reinforcement learning-based neural network, which will be described below, is referred to as a second neural network.

The resource allocation apparatus uses the estimated locations of the small base stations to allocate resources to the small base stations. An actual communication environment has a variety of cases, and thus it is almost impossible to find a heuristic method in consideration of all the cases. Accordingly, the resource allocation apparatus may use reinforce learning in which the best result value for a given situation may be output by learning an action capable of being taken in each situation and a corresponding reward.

Q-learning is a reinforcement learning algorithm that consists of an environment, an agent, a state, an action, and a reward. First, the agent (the resource allocation apparatus) may create a new state by taking an action. The agent receives two rewards (i.e., an immediate reward and a future reward) for the taken action from the environment. The immediate reward is a reward that immediately occurs due to the action taken by the agent, and the future reward is a reward for a future environment caused by the action. As a result, the final goal of the agent is to update a quality (Q) value so that the two rewards may be maximally received. The most important thing in the Q-learning is the Q-value. This value, which is a function of a current situation and an action to be taken, represents the degree of value of an action when the action is taken in a given situation. That is, an action having a high Q-value in a given situation finally provides a great benefit. An equation for updating the Q-value, which is the most basic in the Q-learning is expressed by Equation 1 below:

$$Q_{t+1}(s_t, a_t) \leftarrow \qquad [\text{Equation 1}]$$
$$Q_t(s_t, a_t) + \alpha_t(s_t, a_t) * \left[ r_{t+1} + \gamma \max_a Q_t(s_{t+1}, a) - Q(s_t, a_t) \right]$$

where Q is quality for each state, s is a time state, α is an action, and r is a reward. s indicates a current distribution situation and required communication traffic of small base stations, and α indicates a resource assignment status of a backhaul network. Q is a function of how well the current distribution situation and the resource assignment status match. γ is a discount factor, which ranges from 0 to 1. When γ is close to 0, the importance of compensation for the present is emphasized. When γ is close to 1, the importance of compensation for the future is emphasized. Also, $\alpha_t$ is a learning ratio, which ranges from 0 to 1, and determines the learning ratio of the Q value. For example, when $\alpha_t$=0, the agent does not perform learning. When $\alpha_t$=1, the agent performs learning by utilizing the most recent information. The agent has to perform learning through previous Q values, and thus it is assumed that $\alpha_t$=1.

However, the conventional Q-learning has a characteristic of storing Q values for all possible situations, so that it is difficult to apply to an actual communication situation in which there are infinitely many possible situations. An actual communication situation includes various base stations and users, required communication traffic, etc., and transitions to another state when such items are changed. When Q-values are stored individually for such many situations, storage space and computational complexity increase exponentially. In order to solve the above problem, a method called Deep Q-Network (DQN) has been proposed. The DQN is a method of substituting a neural network for a part for storing a Q value for each situation in Q-learning. The DQN is an algorithm for adding a value network to a Q-learning technique and performing reinforcement learning on wide state space. When having a sufficient number of layers, the neural network used for the DQN is characterized in that any arbitrary function may be approximated sufficiently accurately. That is, a Q value is determined through a method of approximating a function between a situation and a Q value, instead of a Q value being stored for each situation in Q-learning. The resource allocation apparatus allocates resources to small base stations using the DQN. The DQN corresponds to the above-described second neural network.

Figure 7:
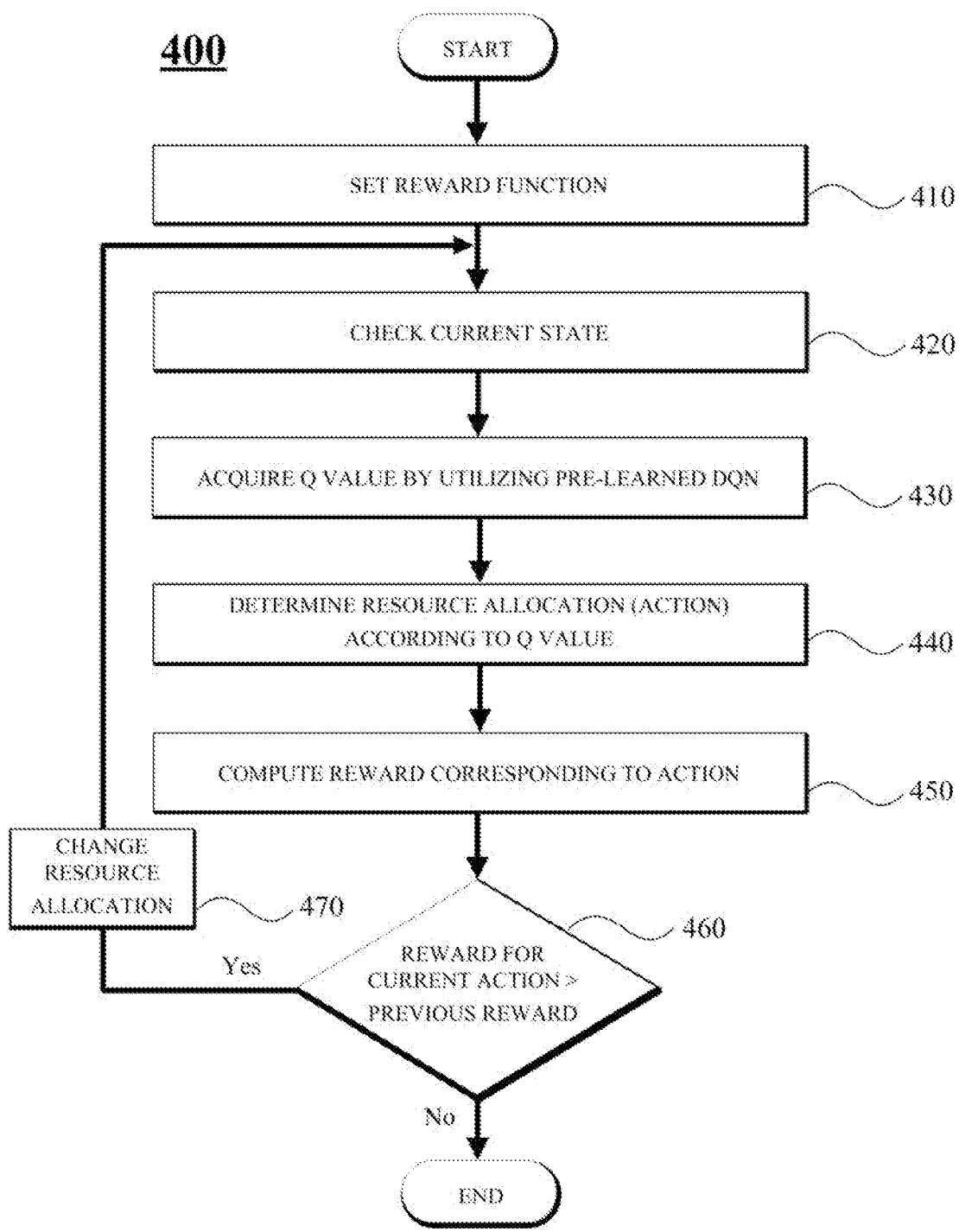
FIG. 7 illustrates an example flowchart of a method of allocating resources using a reinforcement learning neural network.

FIG. 7 illustrates an example flowchart of a resource allocation process 700 using a reinforcement learning neural network. FIG. 7 is an example of a schematic process, by the resource allocation apparatus, of allocating resources to a small base station using the DQN. The resource allocation apparatus may preset an appropriate reward function suitable for each service type, network situation, and the like (410). The reward function will be described below. The resource allocation apparatus checks a current state on the basis of the location of the small base station (420). The resource allocation apparatus acquires a Q value by inputting the current state to the pre-learned DQN (430). The resource allocation apparatus determines an action of specific resource allocation corresponding to the Q value (440). Subsequently, the resource allocation apparatus computes a reward corresponding to the action (450). The resource allocation apparatus compares the reward for the current action to a previously computed reward (a reward for a previous action) (460). When the reward corresponding to the current action is greater than the previous reward, the resource allocation apparatus changes the resources allocated to the small base station (470).

To design a state, an action, and a reward, it is necessary to consider a communication situation of an ultra-wide-area wireless backhaul network. The state, which is a communication situation, may be distribution and required traffic of small base stations. The action may be a distribution (allocation) status of resources and narrow beams. The reward may be the capacity of a current communication network. Further, considering a reward part as another factor, it is also possible to perform services suitable for various communication environments.

Figure 8:
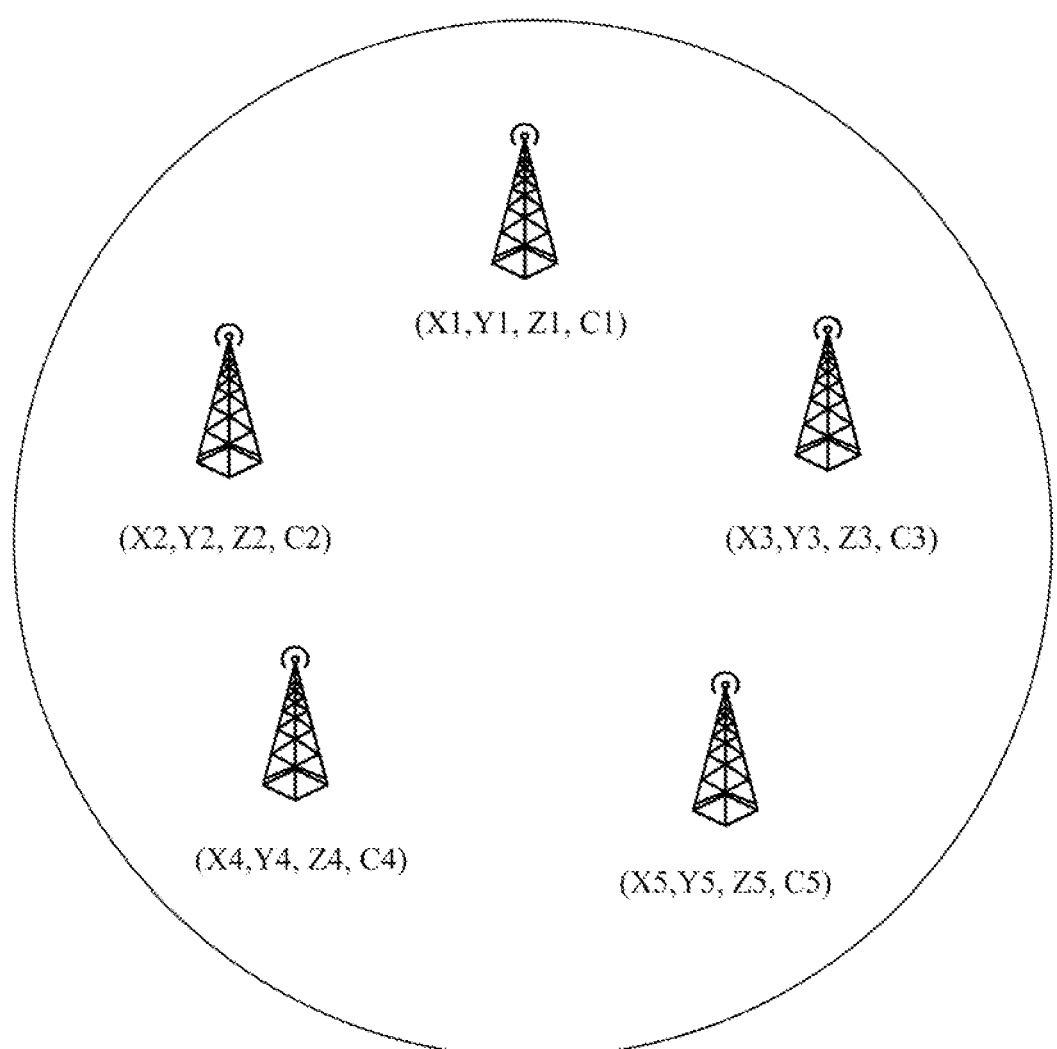
FIG. 8 illustrates an example of a state used in reinforcement learning.

FIG. 8 illustrates an example showing a state used in reinforcement learning. FIG. 8 shows a situation in which five small base stations are distributed in one group beam. In this case, the state may be determined by a distribution situation and a required capacity of each small base station, as expressed in Equation 2 below:

$$S(t)=(X,Y,Z,C)_t. \qquad [\text{Equation 2}]$$

In Equation 2, X={$x_1$, $x_2$, $x_3$, . . . , $x_n$}, Y={$y_1$, $y_2$, $y_3$, . . . , $y_n$}, and Z={$z_1$, $z_2$, $z_3$, . . . , $z_n$} are x, y, and z coordinates of the small base stations in the group beam with respect to time t. C is a required capacity of each small base station. Here, a reason for not using the CSI is that the CSI is changed when the location of the small base station is changed after the narrow beam is allocated in the following process. That is, the reason is that the state is changed by the action.

The action taken by the resource allocation apparatus is allocation of narrow beams and resources. For example, when n narrow beams and a total of allocable resources R are present, an action A(t) at time t is given by Equation 3 below:

$$A(t)=(\{x_1,y_1,R_1\}, \ldots ,\{x_n,y_n,R_n\})_t, \Sigma R_n=R \qquad [\text{Equation 3}]$$

Meanwhile, the reward may be designed on the basis of various values. For example, while increasing an average capacity to be used by the small base station, it is possible to design a reward capable of optimizing various variables. An example of the reward function is expressed as Equation 4 below:

$$R_{t+1} = C_{avg} - \alpha I_{avg} - \beta(C_{avg} - C_{min\ \%}) - \gamma E_{tot} \quad \text{[Equation 4]}$$

where $C_{avg}$ is an average capacity of the entire network, $I_{avg}$ is an average interference level measured by the small base stations, $C_{min\ \%}$ is an average capacity of min % of base stations with the lowest network usage, and $E_{tot}$ is total energy used in communication. Also, $I_{avg}$ is a value corresponding to interference between beams. Also, $C_{min\ \%}$ indicates the average capacity of base stations with a network usage less than or equal to a certain reference value (%). For example, $C_{min10\%}$ corresponds to the average capacity of 10% of base stations with the lowest network usage. For convenience of description, it is assumed that the reference value is 10%.

$\alpha$, $\beta$, and $\gamma$ are weights. Also, $\alpha$, $\beta$, and $\gamma$ are variables for defining the importance of the variables. As the variables increases, the variables behind the variables are considered important. For example, when $\alpha$ has a large value, a reward value is significantly reduced although there is a little interference. This greatly reduces the interference even at the expense of average capacity. $\beta$ is a variable for capacities of 10% of base stations with the lowest network usage. Increasing $\beta$ means that the resources are distributed such that a network capacity variance is reduced. $\gamma$ is a variable for total consumed energy. When $\gamma$ increases, communication is performed using the minimum energy. As a result, the resource allocation apparatus may perform resource allocation according to a service characteristic or network situation by adjusting the weights $\alpha$, $\beta$, and $\gamma$ in the reward function.

The DQN should be pre-learned. Briefly, the resource allocation apparatus checks a current state S(t). The agent acquires a Q value using the DQN. The resource allocation apparatus selects an action for determining a resource type allocated according to the Q value. Subsequently, the resource allocation apparatus observes a reward corresponding to the action. When the learning is not complete, the resource allocation apparatus stores its own action and a reward corresponding to the action. This process is repeated until the learning is complete. Through this process, the resource allocation apparatus provides a DQN for resource allocation. The resource allocation apparatus may perform learning while performing resource allocation in an actual environment. Also, the resource allocation apparatus may use certain sample data in order to perform pre-learning.

Figure 9:
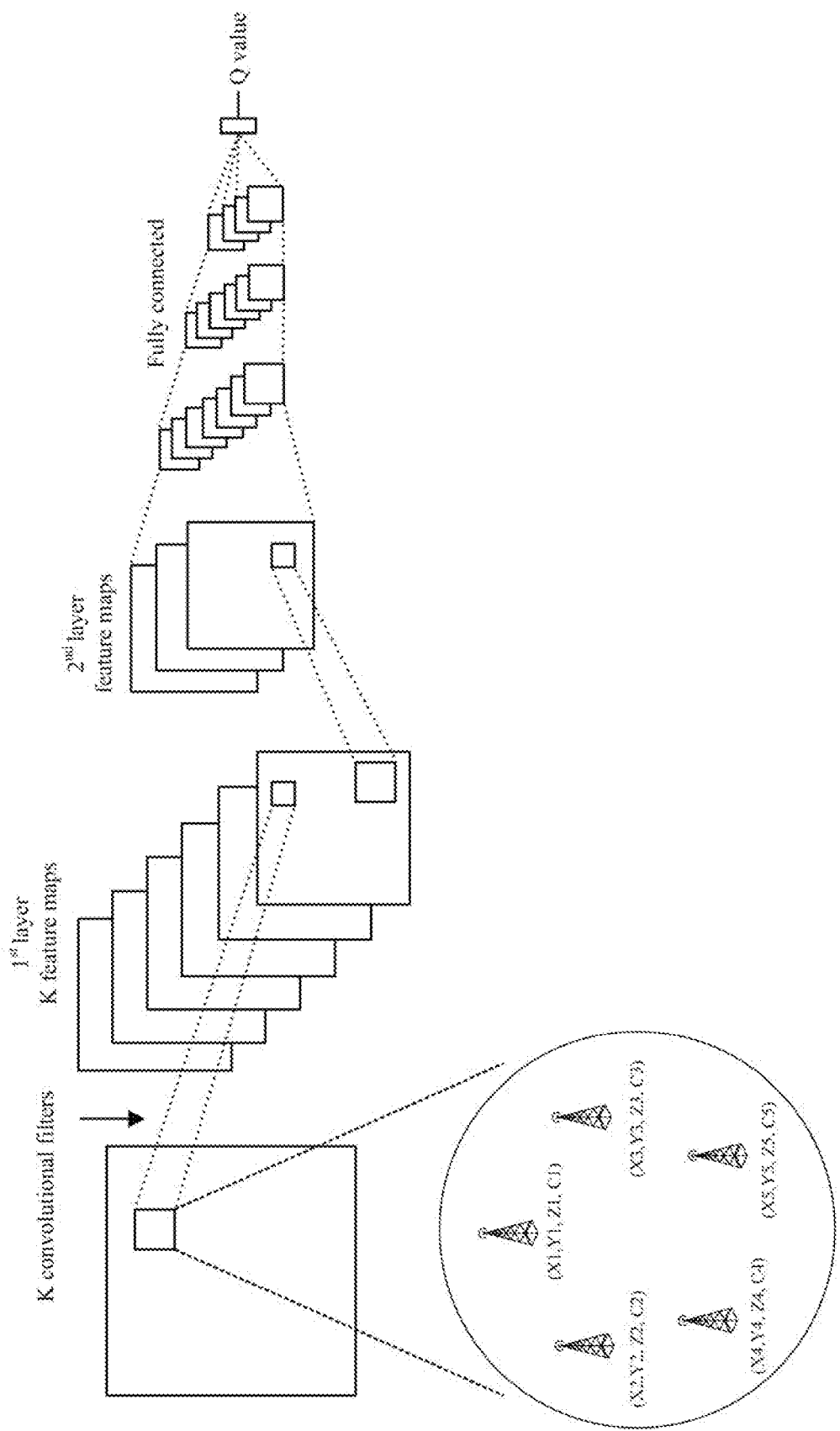
FIG. 9 illustrates an example of a reinforcement learning neural network.

FIG. 9 illustrates an example of a reinforcement learning neural network. FIG. 9 shows an example of a DQN having a convolutional neural network (CNN) structure. FIG. 9 is an example DQN, and various neural networks having other structures may be used. The CNN is composed of some convolutional layers and some fully connected layers. Each of the convolutional layers extracts a feature from a state observed through a convolution mask and shared weights. By superimposing the convolutional layers, it is possible to find more complex features. Each of the fully connected layers may derive a Q value using the found complex features.

In FIG. 9, the first convolutional layer receives the current location and required communication capacity of a small base station as an input. This layer finds a low level feature using a 5×5 convolution mask. The low feature level means, for example, a simple feature such as distribution and density of terminals between any two access points (APs). The subsequent two layers find a high level feature using a 3×3 convolution mask. In the last layer, 2×2 max pooling is performed. The max pooling is a task of leaving only one maximum value in the n×n mask and can be seen as a task of reducing accuracy by reducing data. After this layer, all output values are input to the fully connected layers. The first fully connected layer may have a dimension of 100, and the subsequent fully connected layers may have dimensions of 100 and 10. This is to gradually reduce the number of output values of neurons to leave only important features. Finally, a Q value is derived by collecting a plurality of output values into one neuron.

Figure 10:
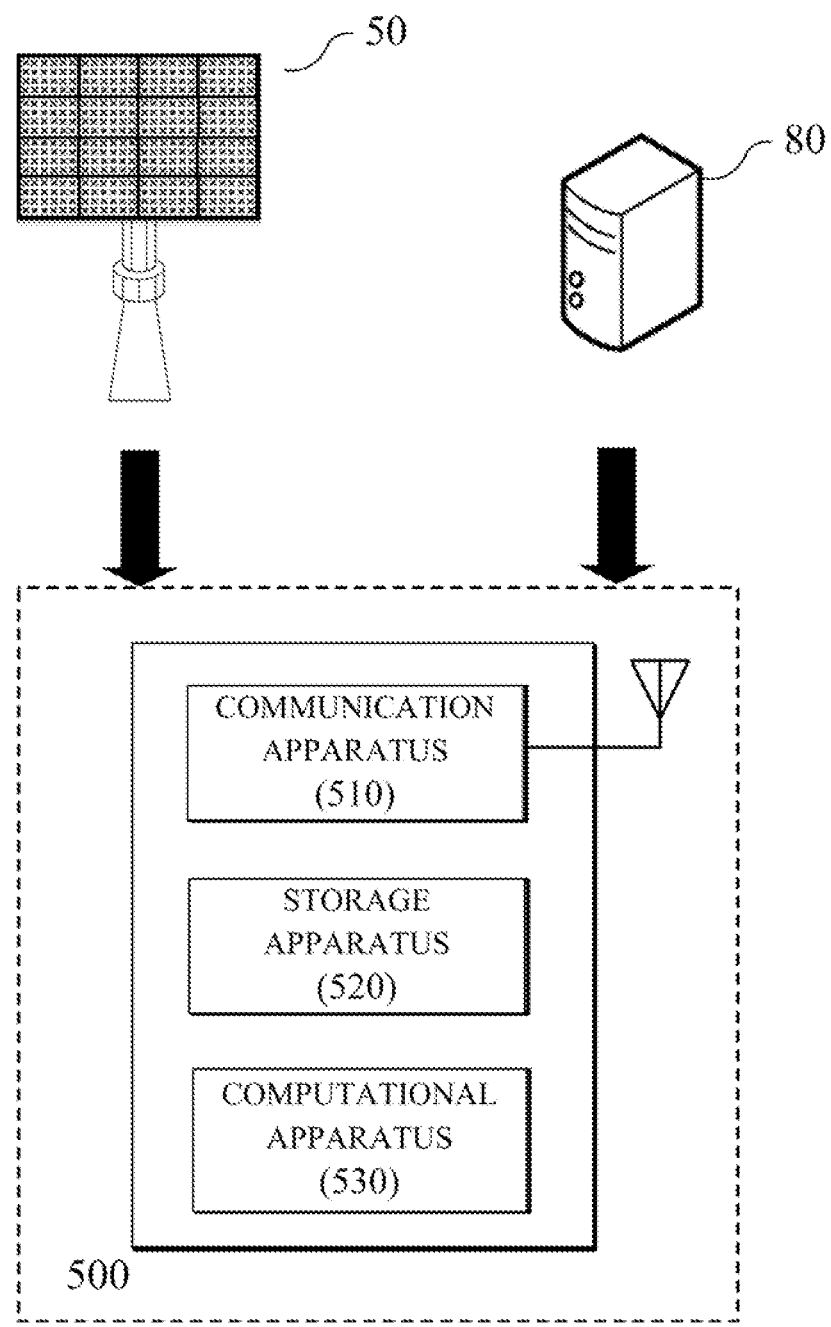
FIG. 10 illustrates an example block diagram showing a configuration of a resource allocation apparatus.

FIG. 10 illustrates an example block diagram showing a configuration of a resource allocation apparatus 500. As described above, the resource allocation apparatus 500 may be a wireless backhaul apparatus 50 or a separate control apparatus 80. The resource allocation apparatus 500 corresponds to a computer apparatus capable of data processing and computation. The resource allocation apparatus 500 may be a separate computer apparatus built in the wireless backhaul apparatus 50. Alternatively, the resource allocation apparatus 500 may be a chip embedded into the wireless backhaul apparatus 50. The embedded chip may contain a program for the above-described resource allocation for the wireless backhaul network. The resource allocation apparatus 500 may include a communication apparatus 510, a storage apparatus 520, and a computational apparatus 530.

The communication apparatus 510 receives CSI information measured by each of a plurality of small base stations. Here, the CSI information includes first CSI and second CSI. The communication apparatus 510 may receive the CSI information from a small base station directly or via another object. The communication apparatus 510 may include a communication module according to a communication scheme in which the CSI information is delivered. Further, the communication apparatus 510 may include an antenna when the CSI information is received in a wireless manner.

The storage apparatus 520 stores the above-described first neural network and second neural network. The first neural network and the second neural network are pre-learned. The first neural network estimates a location of a small base station using the CSI measured by the small base station. The second neural network determines allocation of resources to the plurality of small base stations using reinforcement learning on the basis of the estimated location. Further, the storage apparatus 520 may store the received CSI information, the location of the small base station, and information regarding the allocation of resources to the small base stations. The storage apparatus 520 may be implemented with an apparatus such as a hard disk, a flash memory, and the like.

Although not shown in FIG. 10, the resource allocation apparatus 500 may include a memory. The memory may store data used during the resource allocation process and data occurring during the resource allocation process.

The computational apparatus 530 may determine allocation of resources to small base stations using the received information and the neural network stored in the storage apparatus 520. The computational apparatus 530 estimates the locations of the plurality of small base stations by inputting the CSI to the first neural network. The computational apparatus 530 determines states and actions for the small base stations on the basis of the estimated locations of the plurality of small base stations. An action indicates allocation of resources to a small base station. Also, the computational apparatus 530 may change the allocation of resources to the small base station while comparing a reward of a current state action to a previous reward. The computational apparatus 530 may include a memory for storing a program for location estimation and resource allocation for the small base station and a processor for processing data and information. The computational apparatus 530 may be an apparatus such as a processor for processing data and performing certain computation, an AP, or a chip in which a program is embedded.

Also, the above-described resource allocation method for the wireless backhaul network may be implemented with software including an executable program that may be executed by a computer. The program may be stored and provided in a non-transitory computer readable medium.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums. The computer readable recording medium may include any data storage device that can store data which can be thereafter read by a computer system or processing device. Examples of the computer readable recording medium include read-only memory (ROM), random-access memory (RAM), CD-ROMs, magnetic tapes, floppy disks, optical data storage devices. Also, functional programs, codes, and code segments for accomplishing the examples disclosed herein can be easily construed by programmers skilled in the art to which the examples pertain based on and using the flow diagrams and block diagrams of the figures and their corresponding descriptions as provided herein.

A storage or memory may include a computer component and a recording medium used to retain digital data. Examples of a computer storage or memory include semiconductor storage read-write random-access memory, such as DRAM, hard disk drives, optical disc drives, and the like.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A reinforcement learning-based resource allocation method for a wireless backhaul network, the method comprising:
   estimating, by a resource allocation apparatus, locations of a plurality of base stations based on channel state information (CSI) measured by the plurality of base stations; and
   allocating, by the resource allocation apparatus, resources of the wireless backhaul network to the plurality of base stations using a reinforcement learning neural network having the locations as an input,
   wherein the resource allocation apparatus estimates the locations by inputting, to a first neural network, first CSIs measured by the plurality of base stations using a reference signal transmitted by the wireless backhaul network and a second CSI measured with respect to adjacent neighboring base stations among the plurality of base stations.

2. The reinforcement learning-based resource allocation method of claim 1, wherein the first neural network is a recurrent neural network (RNN).

3. The reinforcement learning-based resource allocation method of claim 1, wherein the first CSIs are measured using reference signals transmitted by some antennas of the wireless backhaul network.

4. The reinforcement learning-based resource allocation method of claim 1, wherein the reinforcement learning neural network defines, as a state, a location and a required communication capacity of each of the plurality of base stations.

5. The reinforcement learning-based resource allocation method of claim 1, wherein the reinforcement learning neural network has an action of allocating, to at least one of the plurality of base stations, a plurality of narrow beams and allocable resources supported by an ultra-wide-area wireless backhaul network.

6. The reinforcement learning-based resource allocation method of claim 1, wherein the reinforcement learning neural network includes a neural network for determining a Q value in Q-learning.

7. The reinforcement learning-based resource allocation method of claim 1, wherein the reinforcement learning neural network determines a reward on the basis of at least one of an average capacity of the entire network, an average interference level measured by the plurality of base stations, an average capacity of some users who have received services from the plurality of base stations, and total energy used for communication.

8. The reinforcement learning-based resource allocation method of claim 1, wherein the resource allocation apparatus allocates resources to the plurality of base stations using a reward ($R_{t+i}$) determined using the following equation:

$$R_{t+1} = C_{avg} - \alpha I_{avg} - \beta(C_{avg} - C_{min\,\%}) - \gamma E_{tot}$$

where $C_{avg}$ is an average capacity of the entire network, $I_{avg}$ is an average interference level measured by all of the base stations, $C_{min\,\%}$ is an average capacity of min % of the base stations with the lowest network usage, $E_{tot}$ is total energy used for communication, and $\alpha$, $\beta$, and $\gamma$ are weights.

9. A reinforcement learning-based resource allocation apparatus for a wireless backhaul network, the reinforcement learning-based resource allocation apparatus comprising:
   a communication apparatus configured to receive channel state information (CSI) measured by a plurality of base stations;
   a storage configured to store a first neural network for estimating locations of the plurality of base stations using a plurality of pieces of CSI and a second neural network for determining allocation of resources to the plurality of base stations using reinforcement learning on the basis of the estimated locations; and
   a processor configured to estimate the locations of the plurality of base stations by inputting the CSI to the first neural network and determine allocation of resources of the wireless backhaul network to the plurality of base stations on the basis of a reward for a current state determined by inputting the estimated locations to the second neural network,
   wherein the CSI includes first CSIs measured by the plurality of base stations using a reference signal transmitted from the wireless backhaul network and a second CSI measured with respect to adjacent neighboring base stations among the plurality of base stations.

10. The reinforcement learning-based resource allocation apparatus of claim 9, wherein the first neural network is a recurrent neural network (RNN).

11. The reinforcement learning-based resource allocation apparatus of 9, wherein the first CSIs are measured using reference signals transmitted by some antennas of the wireless backhaul network.

12. The reinforcement learning-based resource allocation apparatus of claim 9, wherein a state used in the reinforcement learning is defined using a location and a required communication capacity of each of the plurality of base stations.

13. The reinforcement learning-based resource allocation apparatus of claim 9, wherein the processor determines the reward on the basis of at least one of an average capacity of the entire network, an average interference level measured by the plurality of base stations, an average capacity of some users who have received services from the plurality of base stations, and total energy used for communication.

14. The reinforcement learning-based resource allocation apparatus of claim 9, wherein the second neural network includes a neural network for determining a Q value in Q-learning.

15. The reinforcement learning-based resource allocation apparatus of claim 9, wherein the processor allocates, to at least one of the plurality of base stations, a plurality of narrow beams and allocable resources supported by an ultra-wide-area wireless backhaul network on the basis of the reward for the current state and a reward for a previous state thereof.

16. A machine learning-based resource allocation method for a wireless backhaul network, the machine learning-based resource allocation method being performed by a resource allocation apparatus and comprising:
   estimating locations of a plurality of base stations using a first neural network having channel state information (CSI) measured by the plurality of base stations as an input; and
   allocating resources of the wireless backhaul network to the plurality of base stations using a second neural network having the locations as an input,
   wherein the resource allocation apparatus estimates the locations of the plurality of base stations by inputting, to the first neural network, first CSIs measured by the plurality of base stations on the basis of reference signals transmitted from some antennas of the wireless backhaul network and a second CSI measured with respect to adjacent neighboring base stations among the plurality of base stations.

17. The machine learning-based resource allocation method of claim 16, wherein the second neural network is a Deep Q-Network (DQN) including a neural network for determining a Q value in Q-learning.

* * * * *